(12) United States Patent
Sugawa et al.

(10) Patent No.: US 10,252,604 B2
(45) Date of Patent: Apr. 9, 2019

(54) ATTACHING STRUCTURE OF ROOF SIDE WEATHER STRIP

(71) Applicants: TOYODA GOSEI CO., LTD., Kiyosu-shi, Aichi-ken (JP); HONDA MOTOR CO., LTD., Tokyo (JP)

(72) Inventors: Hiroshi Sugawa, Kiyosu (JP); Futoshi Kobayashi, Wako (JP)

(73) Assignees: TOYODA GOSEI CO., LTD., Aichi-pref. (JP); HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/641,526

(22) Filed: Jul. 5, 2017

(65) Prior Publication Data

US 2018/0009299 A1 Jan. 11, 2018

(30) Foreign Application Priority Data

Jul. 6, 2016 (JP) ................................. 2016-133967

(51) Int. Cl.
*B60J 10/36* (2016.01)
*B60J 10/21* (2016.01)
(Continued)

(52) U.S. Cl.
CPC ............. *B60J 10/36* (2016.02); *B60J 10/21* (2016.02); *B60J 10/23* (2016.02); *B60J 10/77* (2016.02); *B60J 10/90* (2016.02)

(58) Field of Classification Search
CPC ... B60J 10/21; B60J 10/36; B60J 10/77; B60J 10/23; B60J 10/233; B60J 10/2335; B60J 10/90; B60R 13/06
See application file for complete search history.

(56) References Cited

U.S. PATENT DOCUMENTS 4,047,751 A * 9/1977 Koike .................... B60J 10/248
296/146.9
4,807,923 A * 2/1989 Nakamura ............. B60J 10/248
296/146.2
(Continued)

FOREIGN PATENT DOCUMENTS

JP 56-127013 U1 10/1981
JP 58-009811 U1 1/1983
(Continued)

OTHER PUBLICATIONS

Office action dated Mar. 2, 2018 issued in corresponding JP patent application No. 2016-133967 (and English translation thereof).

*Primary Examiner* — Hilary L Gutman
(74) *Attorney, Agent, or Firm* — Posz Law Group, PLC

(57) ABSTRACT

According to an attaching structure of a roof side weather strip, a retainer includes a vehicle upper side wall, a connecting part, and an inboard side wall. A first tip locking part, formed in a tip of the vehicle upper side wall, is engaged in a tip locking groove, formed in a tip of a vehicle upper side wall of the weather strip. The vehicle upper side wall of the weather strip is held by the vehicle upper side wall of the retainer. The inboard side wall of the retainer is allowed to abut on an inboard side wall of the weather strip, and a tip of a second tip locking part formed by bending the tip obliquely in the inboard direction is engaged in the engaging groove, so that the inboard side wall of the weather strip is held by the inboard side wall of the retainer.

7 Claims, 3 Drawing Sheets

(51) Int. Cl.
*B60J 10/23* (2016.01)
*B60J 10/77* (2016.01)
*B60J 10/90* (2016.01)

(56) References Cited

U.S. PATENT DOCUMENTS

| | | | | |
|---|---|---|---|---|
| 5,311,702 | A * | 5/1994 | Moore | B60J 10/248 |
| | | | | 296/135 |
| 5,548,929 | A * | 8/1996 | Larsen | B60J 10/22 |
| | | | | 24/297 |
| 2005/0279027 | A1* | 12/2005 | Tsuchida | B60J 10/24 |
| | | | | 49/495.1 |
| 2006/0162256 | A1* | 7/2006 | Tsuchida | B60J 10/79 |
| | | | | 49/479.1 |
| 2009/0108625 | A1* | 4/2009 | Minami | B60J 10/277 |
| | | | | 296/146.2 |
| 2014/0075848 | A1* | 3/2014 | Masumoto | B60J 10/046 |
| | | | | 49/495.1 |
| 2017/0368922 | A1* | 12/2017 | Kuwabara | B60J 10/84 |
| 2017/0368923 | A1* | 12/2017 | Kuwabara | B60J 10/84 |
| 2018/0009301 | A1* | 1/2018 | Kobayashi | B60J 10/77 |
| 2018/0086189 | A1* | 3/2018 | Yamada | B60J 10/16 |

FOREIGN PATENT DOCUMENTS

| | | |
|---|---|---|
| JP | 2004-082808 A | 3/2004 |
| JP | 2005-255007 A | 9/2005 |
| JP | 2008-162474 A | 7/2008 |

* cited by examiner

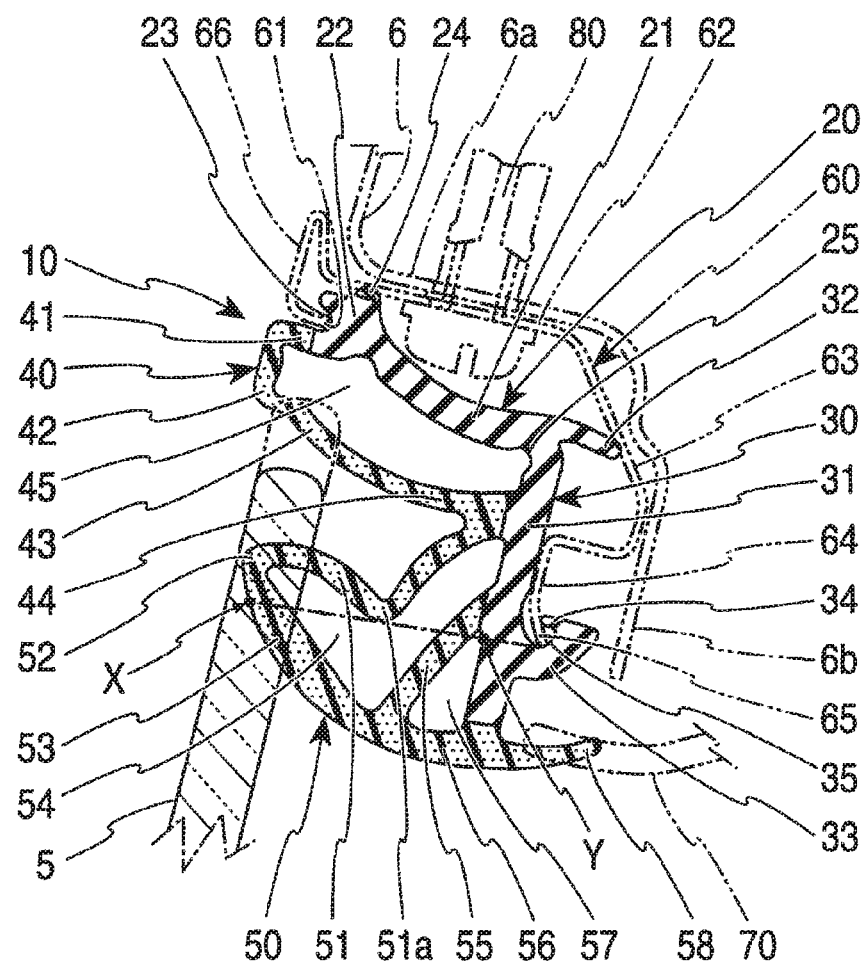

PRIOR ART

PRIOR ART

ATTACHING STRUCTURE OF ROOF SIDE WEATHER STRIP

CROSS-REFERENCE TO RELATED APPLICATION(S)

This application is based upon and claims the benefit of priority from Japanese Patent Application No. 2016-133967, filed on Jul. 6, 2016, the entire contents of which are incorporated herein by reference.

BACKGROUND

1. Field of the Invention

The present invention relates to an attaching structure of a roof side weather strip for vehicles which seals between an upper portion of a door opening edge of a vehicle body and a door glass of a door.

2. Description of the Related Art

In the related art, in a sealing structure which seals between a peripheral edge of a vehicle body opening of a vehicle and a door provided with a door sash, for example, an opening trim weather strip is attached in a flange of the peripheral edge of the vehicle body opening, a door weather strip is attached in an outer periphery of the door sash, a hollow seal portion of the opening trim weather strip abuts on a protrusion of the door sash when the door is closed, and the hollow seal portion and a seal lip of the door weather strip abut on the outer panel of the peripheral edge of the vehicle body opening, so as to seal between a vehicle body and the door.

At that time, the elevating/lowering door glass of the door is held by a glass run provided in the inner periphery of the door sash, and is elevated/lowered in a groove of the glass run. The sealing between the door glass and the door sash is performed by the glass run.

However, in this case, in the appearance of the side surface of the vehicle, the glass run around the door glass or the door sash is present, and a center pillar is formed in a prominent shape. Since the glass run is present in the center pillar of the door sash, a gap exists on a surface between the door sash and the door glass, which is not preferable in design.

For this reason, as illustrated in FIG. 3, as a sashless door type vehicle body, the door sash is not provided, and in the upper portion from the belt line portion of the door 1, only the door glass 5 is elevated/lowered freely. Accordingly, in the side surface of the vehicle, the upper portion of the door 1 from the belt line portion can be set as the appearance of only the door glass 5.

In this case, as illustrated in FIG. 4, in a roof side weather strip 110, an attaching base portion 111 is formed of a solid material, a first hollow seal portion 120, a second hollow seal portion 130, and a cover lip 140 are formed of a sponge material, and a bottom wall 112 of the attaching base portion 111 adheres to a molding 9 attached in a peripheral edge 6 of a vehicle body opening by a double-coated adhesive tape 8, and is attached in a screwed retainer 170 in a locking manner (for example, see JP-A-2008-162474).

In this case, an attaching strength in the retainer 170 is improved, and the deformation of the attaching base portion 111 is reduced. However, a cost increases since the molding or the double-coated adhesive tape 8 is used, and the overall weight of the roof side weather strip 110 cannot be reduced so that the vehicle is not reduced in weight.

As illustrated in FIG. 5, the retainer 260 is attached in the peripheral edge 6 by an attachment screw 280, and an outboard engaging groove 211 and an inboard engaging groove 212 of a roof side weather strip 210 are attached by being engaged by an outboard locking part 261 and an inboard locking part 262 of the retainer 260 (for example, see JP-A-2005-255007).

In this case, the cost is reduced. However, the outboard engaging groove 211 and the inboard engaging groove 212 are pinched by the tips of the outboard locking part 261 and the inboard locking part 262 of the retainer 260. When a holding force increases, the roof side weather strip 210 is hardly assembled with the retainer 260, whereby it is hard to raise the holding force sufficiently.

For this reason, in the sashless door type vehicle, an attaching structure of a roof side weather strip has been demanded which is excellent in an assembling property and a holding property and can reduce a cost.

SUMMARY

According to a first aspect of the invention, there is provided an attaching structure of a roof side weather strip which is attached in a retainer provided in a peripheral edge of a vehicle body opening of a sashless door type vehicle body on a roof side, and seals between the peripheral edge of the vehicle body opening and a periphery of a door glass of a door, wherein: the retainer includes a vehicle upper side wall which is attached in an upper wall of the peripheral edge of the vehicle body opening, a connecting part extending from the vehicle upper side wall of the retainer, and an inboard side wall which extends from the connecting part and is formed in parallel to an inboard side wall of the peripheral edge of the vehicle body opening; a first tip locking part is formed in a tip of the vehicle upper side wall of the retainer, and a tip of the first tip locking part is formed to be bent in an inboard direction; a second tip locking part is formed in a tip of the inboard side wall of the retainer, and a tip of the second tip locking part is formed to be bent obliquely in the inboard direction; the roof side weather strip is formed to oppose the vehicle upper side wall of the retainer, and includes a vehicle upper side wall of the weather strip, an inboard side wall of the weather strip which is formed to be bent from an inboard tip of the vehicle upper side wall of the weather strip and abuts on the inboard side wall of the retainer, and a sealing part which performs sealing by abutting on the door glass; a tip locking groove which locks the tip of the first tip locking part is formed in a tip of the vehicle upper side wall of the weather strip; an engaging part extending in the inboard direction is formed in an inboard surface of the inboard side wall of the weather strip, and an engaging groove is provided in the engaging part; the first tip locking part is engaged in the tip locking groove, and the vehicle upper side wall of the weather strip is held by the vehicle upper side wall of the retainer; and the inboard side wall of the retainer is allowed to abut on the inboard surface of the inboard side wall of the weather strip, and the tip of the second tip locking part formed by bending the tip obliquely in the inboard direction is engaged in the engaging groove, so that the inboard side wall of the weather strip is held by the inboard side wall of the retainer.

In the first aspect of the present invention, the retainer has the vehicle upper side wall of the retainer which is attached in the upper wall of the peripheral edge of the vehicle body opening, the connecting part which extends from the vehicle upper side wall of the retainer, and the inboard side wall of the retainer which extends from the connecting part and is formed in parallel to the inboard side wall of the peripheral edge of the vehicle body opening. For this reason, the retainer can be attached along the upper wall of the peripheral edge of the vehicle body opening on the roof side by attaching the vehicle upper side wall of the retainer in the upper wall of the peripheral edge of the vehicle body opening on the roof side, and the inboard side wall of the roof side weather strip can be held by the inboard side wall of the retainer.

The first tip locking part is formed in the tip of the vehicle upper side wall of the retainer, and the tip of the first tip locking part is formed to be bent in the inboard direction. For this reason, the proper assembling property and holding property can be obtained by engaging an engaging part of the vehicle upper side wall of the roof side weather strip in the first tip locking part.

The second tip locking part is formed in the tip of the inboard side wall of the retainer, and the tip of the second tip locking part is formed to be bent obliquely in the inboard direction. For this reason, the proper assembling property and holding property can be obtained by engaging the engaging part of the roof side weather strip in the second tip locking part.

The roof side weather strip is formed to oppose the vehicle upper side wall of the retainer, and has the vehicle upper side wall of the weather strip, the inboard side wall of the weather strip which is formed to be bent from the inboard tip of the vehicle upper side wall of the weather strip and abuts on the inboard side wall of the retainer, and the sealing part which performs sealing by abutting on the door glass. For this reason, the sealing can be performed along the peripheral edge of the vehicle body opening on the roof side by the sealing part when the roof side weather strip is attached not to be conspicuous from the outboard side along the upper wall and the inboard side wall having an L-shaped sectional surface of the peripheral edge of the vehicle body opening.

The tip locking groove which locks the tip of the first tip locking part is formed in the tip of the vehicle upper side wall of the weather strip. For this reason, the vehicle upper side wall of the weather strip can be reliably held by being locked by the first tip locking part.

The engaging part extending in the inboard direction is formed in the inboard surface of the inboard side wall of the weather strip, and the engaging groove is provided in the engaging part. For this reason, the inboard side wall of the weather strip can be reliably held by engaging the second tip locking part in the engaging groove.

The inboard side wall of the retainer is allowed to abut on the inboard surface of the inboard side wall of the weather strip, and the tip of the second tip locking part formed by bending the tip obliquely in the inboard direction is engaged in the engaging groove, so that the inboard side wall of the weather strip is held by the inboard side wall of the retainer. For this reason, the inboard side wall of the weather strip is held by the inboard side wall of the retainer, and the tip is bent obliquely in the inboard direction, so that the second tip locking part is hardly deviated from the engaging groove. The first tip locking part locks the tip locking groove, and the first tip locking part and the second tip locking part are different in angle, so that it is hard to be deviated, and the holding can be performed stably.

According to a second aspect of the present invention, the engaging part may surround an opening of the engaging groove, and may be provided with an engaging lip which abuts on an inboard surface of the tip of the second tip locking part.

In the second aspect of the present invention, the engaging part surrounds the opening of the engaging groove, and is provided the engaging lip which abuts on the inboard surface of the tip of the second tip locking part. For this reason, the engaging lip holds the tip of the second tip locking part, so as to prevent the tip of the second tip locking part from being deviated from the engaging groove, whereby the roof side weather strip can be held reliably.

According to a third aspect of the present invention, the first tip locking part may be formed by bending the tip in the inboard direction in parallel to the vehicle upper side wall of the retainer, and the second tip locking part may be formed by bending the tip in the inboard direction and downward obliquely to the inboard side wall of the retainer.

In the third aspect of the present invention, the first tip locking part is formed by bending the tip in the inboard direction in parallel to the vehicle upper side wall of the retainer, and the second tip locking part is formed by bending the tip in the inboard direction and downward obliquely to the inboard side wall of the retainer. For this reason, both of a direction of the tip of the first tip locking part and a bending direction of the second tip locking part are directed to the inboard direction. However, since the angles thereof are different, the roof side weather strip is hardly deviated from the retainer.

According to a fourth aspect of the present invention, the concave portion may be formed in a connecting portion of the vehicle upper side wall of the weather strip and the inboard side wall of the weather strip.

In the fourth aspect of the present invention, the concave portion is formed in the connecting portion of the vehicle upper side wall of the weather strip and the inboard side wall of the weather strip. For this reason, when the roof side weather strip is attached in the retainer, the vehicle upper side wall of the weather strip and the inboard side wall of the weather strip can be bent to each other around the concave portion, whereby an assembling can be easily performed.

According to a fifth aspect of the present invention, the engaging part may be formed on a tip side of the inboard side wall of the weather strip from an intersection point of the roof side weather strip and a perpendicular line, down to the inboard side wall of the weather strip from a portion where the sealing part abuts on a tip of the door glass.

In the fifth aspect of the present invention, the engaging part is formed on the tip side of the inboard side wall of the weather strip from the intersection point of the roof side weather strip and the perpendicular line down to the inboard side wall of the weather strip from the portion where the sealing part abuts on the tip of the door glass. For this reason, although the inboard side wall of the roof side weather strip is stretched upward by the elevating/lowering of the door glass, the engaging part is locked by the tip of the second tip locking part, whereby it is hard to be deviated.

According to a sixth aspect of the present invention, the sealing part of the roof side weather strip may include a first sealing part formed along the vehicle upper side wall of the weather strip, and a second sealing part formed along the inboard side wall of the weather strip and the first sealing part and the second sealing part may be separated to form a hollow shape.

In the sixth aspect of the present invention, the sealing part of the roof side weather strip has the first sealing part formed along the vehicle upper side wall of the weather strip, and the second sealing part formed along the inboard side wall of the weather strip. For this reason, two positions of the tip of the door glass and the inboard surface can be sealed, whereby the sealing property is excellent. Since the first sealing part and the second sealing part are separated to form the hollow shape, abutting can be performed flexibly and reliably according to the elevating/lowering of the door glass. The deformations of the first sealing part and the second sealing part do not affect each other, whereby the sealing property is excellent.

According to a seventh aspect of the present invention, the second sealing part may include a second sealing part upper wall which extends from the inboard side wall of the weather strip and is bent in an L shape, a second sealing part lower wall which extends in an arc shape from a tip of the inboard side wall of the weather strip, and a second sealing part connecting wall, and the second sealing part may be formed such that the second sealing part upper wall is further bent when door glass abuts on the second sealing part.

In the seventh aspect of the present invention, the second sealing part has the second sealing part upper wall which extends from the inboard side wall of the weather strip and is bent in an L shape, the second sealing part lower wall which extends in an arc shape from the tip of the inboard side wall of the weather strip, and the second sealing part connecting wall. The second sealing part is formed such that the second sealing part upper wall is further bent when the door glass abuts on the second sealing part. For this reason, when the door glass abuts on the second sealing part, the second sealing part upper wall bent in an L shape is easily bent, and an abnormal deformation does not occur in the second sealing part, whereby the door glass can be elevated/lowered smoothly.

The tip locking groove which locks the tip of the first tip locking part is formed in the tip of the vehicle upper side wall of the weather strip. Therefore, the vehicle upper side wall of the weather strip can be held reliably by being locked by the first tip locking part. The engaging part which extends in the inboard direction is formed in the inboard surface of the inboard side wall of the weather strip, and the engaging groove is provided in the engaging part. Therefore, the inboard side wall of the weather strip can be held reliably by engaging the second tip locking part in the engaging groove.

The inboard side wall of the retainer is allowed to abut on the inboard surface of the inboard side wall of the weather strip, and the tip of the second tip locking part formed by bending the tip obliquely in the inboard direction is engaged in the engaging groove, so that the inboard side wall of the weather strip is held by the inboard side wall of the retainer. Therefore, since the inboard side wall of the weather strip is held by the inboard side wall of the retainer so that the tip is bent obliquely in the inboard direction, the first tip locking part and the second tip locking part are different in the bending angle. Thus, the second tip locking part is hardly deviated from the engaging groove, the first tip locking part locks the tip locking groove, and the holding can be performed stably.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 1 is a sectional view partially illustrating an upper portion of a peripheral edge of a vehicle body opening along line A-A of FIG. 3 in the embodiment of the present invention;

FIG. 2 is a front view of a roof side weather strip in the embodiment of the present invention;

DETAILED DESCRIPTION OF THE INVENTION

Figure 3:
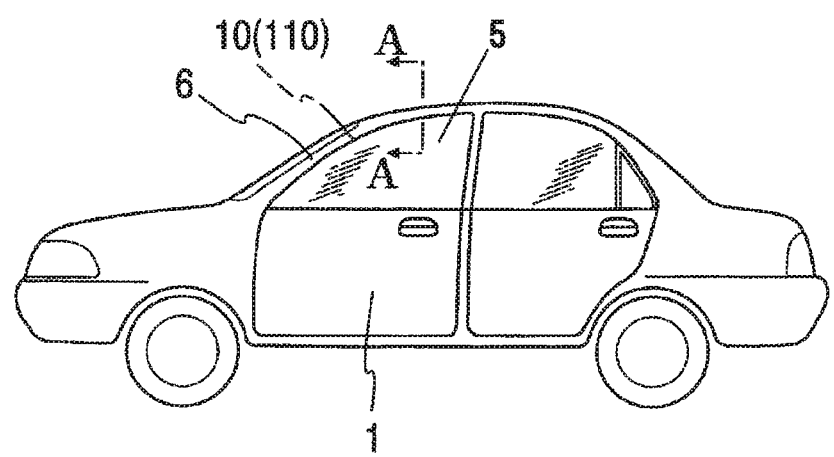
FIG. 3 is a side view of a vehicle.
Figure 4:
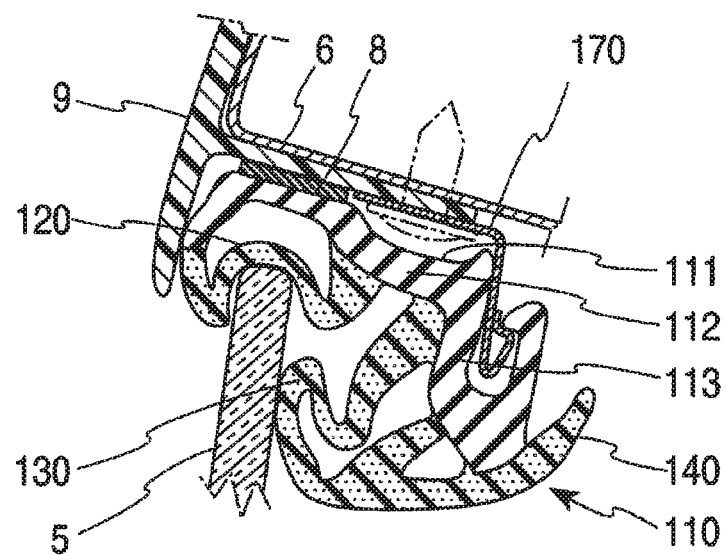
FIG. 4 is a sectional view of a conventional roof side weather strip.
Figure 5:
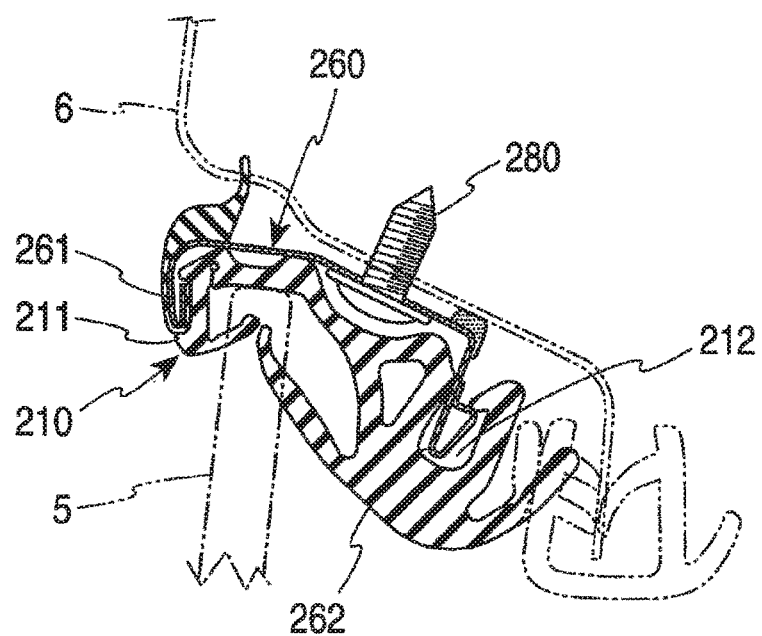
FIG. 5 is a sectional view of another conventional roof side weather strip.

An embodiment of the present invention will be described based on FIGS. 1 to 3. FIGS. 1 and 2 illustrate the embodiment of the present invention. FIG. 3 is a side view of a vehicle. As illustrated in FIG. 3, a roof side weather strip 10 of the present invention is used in a sashless door type vehicle. In each of the upper portions from belt line portions of both of a front door, which is a door 1 of the side surface of the vehicle, and a rear door, a door glass 5 is provided on the substantially entire surface without a door sash, and the door glass 5 can be vertically elevated/lowered from the door 1.

FIG. 1 is a sectional view taken along line A-A of FIG. 3 illustrating an attachment state of a retainer 60, which is attached in a peripheral edge 6 of a vehicle body opening, and the roof side weather strip 10 at the time of closing the door glass 5. FIG. 2 is a front view of the roof side weather strip 10. First, the description will be given about the retainer 60, and next, the description will be given about the roof side weather strip 10.

The roof side of the vehicle body is bent in the vicinity of the peripheral edge 6 inside the vehicle continuously from the roof, so as to form an outside panel on the roof side. In the outside panel, a flat upper wall 6a which contains the upper end of the door glass 5 of each of the front door and the rear door is formed in an entrance part of the peripheral edge 6. The retainer 60 is attached in the lower surface of the upper wall 6a.

An inboard side wall 6b is formed to be bent toward the lower side of the vehicle from the upper wall 6a of the peripheral edge 6 in parallel to the door glass 5.

As illustrated in FIG. 1, the retainer 60 has a flat vehicle upper side wall 62 which is attached by an attachment screw 80 to oppose the upper wall 6a of the peripheral edge 6. The vehicle upper side wall 62 can be attached in the upper wall 6a of the peripheral edge 6 by a clip, spot welding, or the like in addition to the attachment screw 80.

A retainer molding part 66, which is formed to be curved upward continuously from the vehicle upper side wall 62, and of which the tip is formed to be bent in a hairpin shape, and a tip locking part 61, which is formed such that the tip of the retainer molding part 66 is bent in the inboard direction in parallel to the vehicle upper side wall 62, are formed on the outboard side of the vehicle upper side wall 62.

The retainer molding part 66 blocks a space between the retainer 60 and the peripheral edge 6, and can improve an appearance. The tip locking part 61 locks a tip locking groove 23 of a vehicle upper side wall 20 (to be described later) of the roof side weather strip 10, and holds the tip of the roof side weather strip 10 on the outboard side not to be suctioned to the outboard side when the door glass 5 is elevated and closed during high speed traveling.

On the inboard side of the vehicle upper side wall 62, a connecting part 63 is formed continuously from the vehicle upper side wall 62, and an inboard side wall 64 is formed continuously from the connecting part 63.

The connecting part 63 is formed to be bent obliquely downward according to the bending of the peripheral edge 6 from the vehicle upper side wall 62. Further, the connecting part 63 abuts on the inboard side wall 6b of the peripheral edge 6, and is formed to be bent in an outboard direction perpendicularly to the abutting portion.

The inboard side wall 64 is bent perpendicularly to the tip of the connecting part 63, and is formed in parallel to the inboard side wall 6b of the peripheral edge 6. The inboard side wall 64 abuts on an inboard side wall 30 of the roof side weather strip 10 (to be described later) to hold the inboard side wall 30.

A tip locking part 65 is formed in the tip of the inboard side wall 64. The tip locking part 65 is formed such that the tip is bent in the inboard direction and obliquely downward. The tip locking part 65 is engaged in an engaging part 33 of the roof side weather strip 10 (to be described later). In this embodiment, the tip locking part 65 is formed to be bent by 20 to 30° from the inboard side wall 64.

Next, the description will be given about the roof side weather strip 10.

As illustrated in FIG. 2, the roof side weather strip 10 is formed by an upper side portion 11 attached on the roof side of the peripheral edge 6, a vertical side portion 12 attached in the vertical side portion of the peripheral edge 6, and a corner part 13 which is molded by a die molding to be connected with the upper side portion 11 and the vertical side portion 12 and is attached in a corner of the peripheral edge 6.

The roof side weather strip 10 of the present invention relates to the upper side portion 11. The roof side weather strip 10 has the vehicle upper side wall 20 which is formed to oppose the vehicle upper side wall 62 and is held, the inboard side wall 30 which is formed to be bent from the inboard tip of the vehicle upper side wall 20, and a sealing part which performs sealing by abutting on the door glass 5.

In the embodiment of the present invention, the vehicle upper side wall 20 and the inboard side wall 30 are formed of a solid material, and the sealing part is formed of a sponge material. As will be described later, the sealing part is formed by a first sealing part 40 and a second sealing part 50. For this reason, the sealing can be performed along the peripheral edge 6 on the roof side by the sealing part when the roof side weather strip 10 is attached not to be conspicuous from the outboard side along the upper wall 6a and the inboard side wall 6b having an L-shaped sectional surface of the peripheral edge 6.

A vehicle upper side wall tip 22 is formed in the tip of the vehicle upper side wall 20 on the outboard side. The tip locking groove 23, which locks the tip of the tip locking part 61, and a tip abutting protrusion 24, which abuts on the vehicle upper side wall 62, are formed in the vehicle upper side wall tip 22.

For this reason, the tip locking part 61 can hold reliably the vehicle upper side wall 20 in a locking manner. In addition, the tip abutting protrusion 24 is formed of a sponge material. The tip abutting protrusion 24 can hold the vehicle upper side wall 62 without rattling by an abutting manner.

A concave portion 25 is formed on the outboard side of the connecting portion of the vehicle upper side wall 20 and the inboard side wall 30. For this reason, when the roof side weather strip 10 is attached in the retainer 60, the vehicle upper side wall 20 and the inboard side wall 30 of the roof side weather strip 10 can be bent to each other around the concave portion 25, whereby an assembling can be easily performed.

The sealing lip 32 is formed in the inboard surface of the connecting portion of the vehicle upper side wall 20 and the inboard side wall 30. The sealing lip 32 seals a space between the retainer 60 and the roof side weather strip 10 by abutting on the connecting part 63.

The inboard side wall 30 is formed in a plate shape to be attached in parallel to the inboard side wall 6b of the peripheral edge 6. As described above, the inboard side wall 64 of the retainer 60 abuts on the inboard surface of the inboard side wall 30, and holds the inboard side wall 30.

The engaging part 33 extending in the inboard direction is formed on the inboard surface of the inboard side wall 30. An engaging groove 35, and an engaging lip 34 which surrounds the opening of the engaging groove 35 are formed in the engaging part 33. For this reason, the inboard side wall 30 can be held reliably by engaging the tip locking part 65 in the engaging groove 35.

The tip of the tip locking part 65, which is formed such that the tip is bent in the inboard direction and obliquely downward, is engaged in the engaging groove 35 in an inserting manner, and the inboard side wall 30 is held by the inboard side wall 64. For this reason, the tip locking part 65 of which the tip is bent obliquely in the inboard direction has a bending angle different from that of the tip locking part 61 in the inboard direction, so as to be hardly deviated from the engaging groove 35, and thus the holding can be performed stably.

At that time, the engaging lip 34 holds the tip of the tip locking part 65, so as to prevent the tip of the tip locking part 65 from being deviated from the engaging groove 35, and thus the roof side weather strip can be held reliably.

In the embodiment of the present invention, the engaging part 33 is formed on the tip side (lower side in FIG. 1) of the inboard side wall 30 from an intersection point (a point indicated by Y in FIG. 1) of the roof side weather strip 10 and a perpendicular line (a line indicated by a dotted line in FIG. 1) down to the inboard side wall 30 from a portion (a point indicated by X in FIG. 1) where the second sealing part 50 (to be described later) abuts on the tip of the door glass 5.

In this case, although the roof side weather strip 10 is stretched upward (upward in FIG. 1) by the elevating/lowering of the door glass 5, the engaging part 33 is locked by the tip of the tip locking part 65. Therefore, the inboard side wall 30 is hardly deformed by stretching, and is hardly deviated from the tip locking part 65.

In this embodiment, in the sealing part of the roof side weather strip 10, two sealing parts are provided separately. The provided two sealing parts are the first sealing part 40 which is formed along the vehicle upper side wall 20 and the second sealing part 50 which is formed along the inboard side wall 30. The first sealing part 40 and the second sealing part 50 are formed in a hollow shape. The sealing part may be formed as one sealing part. In addition, the sealing part may be formed in a lip shape without a hollow shape.

Since the sealing part has the first sealing part 40 and the second sealing part 50, the sealing part can be sealed dually by the upper end of the door glass 5 and the inboard side surface of the upper end, and the sealing property can be improved. Further, since the first sealing part 40 and the second sealing part 50 are formed separately, when the door glass 5 is elevated/lowered and at the time of closing the door, the deformations of the first sealing part 40 and the second sealing part 50 do not affect each other, and the sealing can be performed separately, thereby securing the sealing property.

The first sealing part 40 is formed by a tip connecting part 41 which is formed to extend slightly in an outboard direction from the vehicle upper side wall tip 22, a first sealing part outboard side wall 42 which is curved from the tip connecting part 41 to extend downward in parallel to the side surface of the door glass 5, a first sealing part body 43 which is formed to be curved in an arc shape from the first sealing part outboard side wall 42, and a base connecting part 44 which continues from the tip of the first sealing part body 43 to an outboard surface of an inboard side wall body 31. A first sealing part hollow part 45 is formed between a vehicle upper side wall body 21 and the first sealing part body 43.

For this reason, when the door glass 5 is elevated so that the tip of the door glass 5 abuts on the first sealing part body 43, the first sealing part body 43 is bent to an inside of a hollow shape of the first sealing part hollow part 45, so as to enfold the tip of the door glass 5, and the first sealing part outboard side wall 42 abuts on the side surface of the door glass 5 on the outboard side, thereby improving the sealing property.

The second sealing part 50 has a second sealing part upper wall 51 which extends from the inboard side wall body 31 and is bent in an L shape, a second sealing part lower wall 53 which is formed in an arc shape from a second sealing part tip 52 of the tip of the second sealing part upper wall 51, and a second sealing part connecting wall 56 which is formed to extend from the tip of the second sealing part lower wall 53 and is connected with the tip of the inboard side wall body 31. The portion, which is bent in an L shape, of the second sealing part upper wall 51 forms a second sealing part upper wall bending part 51a.

The second sealing part 50 has a second sealing part bridge 55 which is connected from the connecting portion of the second sealing part lower wall 53 and the second sealing part connecting wall 56 to the vicinity of the center of the inboard side wall body 31.

A second sealing part first hollow part 54 is formed by the second sealing part upper wall 51, the second sealing part lower wall 53, and the second sealing part bridge 55, and a second sealing part second hollow part 57 is formed by the second sealing part bridge 55, the second sealing part connecting wall 56, and the inboard side wall body 31.

When the door glass 5 is elevated, the second sealing part lower wall 53 of the second sealing part 50 abuts on the inboard side surface of the upper end of the door glass 5. As for the elevating of the door glass 5, the second sealing part tip 52 slides on the inboard side surface of the door glass 5, the second sealing part upper wall bending part 51a is bent, and the second sealing part 50 is bent upward, thereby sealing the space between the inboard sdie surface of the door glass 5 and the second sealing part 50.

Since the second sealing part 50 is formed in a hollow shape, a flexibility of the entire second sealing part 50 can be improved, and the overall weight of the roof side weather strip 10 can be reduced. In addition, since the second sealing part 50 does not have a shape of one piece of lip, and has a hollow shape, the rigidity of the second sealing part 50 itself can be improved, and the durability at the time of closing the door and the like can be improved.

Since the second sealing part 50 does not have a lip shape but has a hollow shape, when the door glass 5 is elevated/lowered, compared to the lip shape, winding does not occur, and an abnormal deformation does not occur. Further, since the second sealing part 50 is bent in the second sealing part upper wall bending part 51a as described above when abutting on the door glass 5, the variation of the second sealing part lower wall 53 is small, and the second sealing part tip 52 abuts on the door glass so that the sealing property is not deteriorated.

When the door glass 5 is elevated, the tip of the door glass 5 abuts on the first sealing part body 43 of the first sealing part 40, the first sealing part body 43 covers the tip of the door glass 5 while being bent into the first sealing part hollow part 45, and the tip of the first sealing part outboard side wall 42 can performs sealing by abutting on the door glass 5.

A second sealing part cover lip 58 is formed in an inboard direction from the tip of the second sealing part connecting wall 56. The second sealing part cover lip 58 covers a tip of a garnish 70, so as to block a gap of the peripheral edge 6 from the garnish 70 and the roof side weather strip 10, whereby the appearance can be improved.

As illustrated in FIG. 1, when the roof side weather strip 10 is attached in the retainer 60 of the peripheral edge 6, the tip locking part 61 and the tip locking part 65 of the retainer 60 are different in an angle directed toward the inboard side, and thus, the roof side weather strip 10 is hardly deviated from the retainer 60.

Since the tip locking part 61 and the tip locking part 65 are directed toward the inboard side, when the roof side weather strip 10 is assembled with the retainer 60, the assembling can be easily performed by bending the weather strip vehicle upper side wall 20 and the inboard side wall 30.

The roof side weather strip 10 is formed of a sponge material and a solid material, and a synthetic rubber, a thermoplastic elastomer, and a soft synthetic resin are used for all. For example, an EPDM rubber is used as the synthetic rubber, an olefin-based elastomer is used as the thermoplastic elastomer, and a soft vinyl chloride and the like are used as the soft synthetic resin.

The synthetic rubber is transported to a vulcanization tank after extrusion molding, and vulcanization is performed by heating by hot air, a high-frequency wave, or the like. The thermoplastic elastomer and the soft synthetic resin are solidified by cooling. Thereafter, cutting is performed by a predetermined length, and the production of the extrusion molding portion is completed.

What is claimed is:

1. An attaching structure of a roof side weather strip which is attached in a retainer provided in a peripheral edge of a vehicle body opening of a sashless door type vehicle body on a roof side, and seals between the peripheral edge of the vehicle body opening and a periphery of a door glass of a door, wherein:
    the retainer includes a vehicle upper side wall which is attached in an upper wall of the peripheral edge of the vehicle body opening, a connecting part extending from the vehicle upper side wall of the retainer, and an inboard side wall which extends from the connecting part and is formed in parallel to an inboard side wall of the peripheral edge of the vehicle body opening;
    a first tip locking part is formed in a tip of the vehicle upper side wall of the retainer, and a tip of the first tip locking part is formed to be bent in an inboard direction;
    a second tip locking part is formed in a tip of the inboard side wall of the retainer, and a tip of the second tip locking part is formed to be bent obliquely in the inboard direction;
    the roof side weather strip is formed to oppose the vehicle upper side wall of the retainer, and includes a vehicle upper side wall of the weather strip, an inboard side wall of the weather strip which is formed to be bent from an inboard tip of the vehicle upper side wall of the weather strip and abuts on the inboard side wall of the retainer, and a sealing part which performs sealing by abutting on the door glass;

a tip locking groove which locks the tip of the first tip locking part is formed in a tip of the vehicle upper side wall of the weather strip;

an engaging part extending in the inboard direction is formed in an inboard surface of the inboard side wall of the weather strip, and an engaging groove is provided in the engaging part;

the first tip locking part is engaged in the tip locking groove, and the vehicle upper side wall of the weather strip is held by the vehicle upper side wall of the retainer; and the inboard side wall of the retainer is allowed to abut on the inboard surface of the inboard side wall of the weather strip, and the tip of the second tip locking part formed by bending the tip obliquely in the inboard direction is engaged in the engaging groove, so that the inboard side wall of the weather strip is held by the inboard side wall of the retainer.

2. The attaching structure of the roof side weather strip according to claim 1, wherein
the engaging part surrounds an opening of the engaging groove, and is provided with an engaging lip which abuts on an inboard surface of the tip of the second tip locking part.

3. The attaching structure of the roof side weather strip according to claim 1, wherein:
the first tip locking part is formed by bending the tip in the inboard direction in parallel to the vehicle upper side wall of the retainer; and
the second tip locking part is formed by bending the tip in the inboard direction and downward obliquely to the inboard side wall of the retainer.

4. The attaching structure of the roof side weather strip according to claim 1, wherein
a concave portion is formed in a connecting portion of the vehicle upper side wall of the weather strip and the inboard side wall of the weather strip.

5. The attaching structure of the roof side weather strip according to claim 1, wherein
the engaging part is formed on a tip side of the inboard side wall of the weather strip from an intersection point of the roof side weather strip and a perpendicular line, down to the inboard side wall of the weather strip from a portion where the sealing part abuts on a tip of the door glass.

6. The attaching structure of the roof side weather strip according to claim 1, wherein:
the sealing part of the roof side weather strip includes a first sealing part formed along the vehicle upper side wall of the weather strip, and a second sealing part formed along the inboard side wall of the weather strip; and
the first sealing part and the second sealing part are separated to form a hollow shape.

7. The attaching structure of the roof side weather strip according to claim 6, wherein:
the second sealing part includes a second sealing part upper wall which extends from the inboard side wall of the weather strip and is bent in an L shape, a second sealing part lower wall which extends in an arc shape from a tip of the inboard side wall of the weather strip, and a second sealing part connecting wall; and
the second sealing part is formed such that the second sealing part upper wall is further bent when the door glass abuts on the second sealing part.

* * * * *